(12) United States Patent
Gassara et al.

(10) Patent No.: US 10,830,026 B2
(45) Date of Patent: Nov. 10, 2020

(54) METHOD FOR DEVELOPING A HYDROCARBON RESERVOIR BY INJECTING A GAS IN THE FORM OF FOAM

(71) Applicant: IFP Energies nouvelles, Rueil-Malmaison (FR)

(72) Inventors: Omar Gassara, Nanterre (FR); Frederic Douarche, Rueil Malmaison (FR); Benjamin Braconnier, Antony (FR); Bernard Bourbiaux, Rueil Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 409 days.

(21) Appl. No.: 15/887,498

(22) Filed: Feb. 2, 2018

(65) Prior Publication Data

US 2018/0223638 A1 Aug. 9, 2018

(30) Foreign Application Priority Data

Feb. 3, 2017 (FR) ...................................... 17 50940

(51) Int. Cl.
*E21B 43/16* (2006.01)
*E21B 43/20* (2006.01)
(Continued)

(52) U.S. Cl.
CPC ............ *E21B 43/166* (2013.01); *C09K 8/584* (2013.01); *E21B 43/20* (2013.01); *E21B 47/06* (2013.01); *E21B 47/10* (2013.01)

(58) Field of Classification Search
CPC ........ E21B 43/166; E21B 43/20; E21B 47/06; E21B 47/10; C09K 8/584
See application file for complete search history.

(56) References Cited

U.S. PATENT DOCUMENTS

2015/0308246 A1* 10/2015 Chen ................... E21B 43/2406
166/270.1
2017/0175493 A1* 6/2017 Wang ..................... E21B 43/166

OTHER PUBLICATIONS

Abbaszadeh, Maghsood, Aboulghasem Kazemi Nia Korrani, Jose Luis Lopez-Salinas, Fernando Rodriguez-de La Garza, Antonio Villavicencio Pino, and George Hirasaki. "Experimentally-based empirical foam modeling." In SPE Improved Oil Recovery Symposium. Society of Petroleum Engineers, 2014. (Year: 2014).*

(Continued)

*Primary Examiner* — Rehana Perveen
*Assistant Examiner* — Chuen-Meei Gan
(74) *Attorney, Agent, or Firm* — Fitch, Even, Tabin & Flannery LLP (57) ABSTRACT

A method for developing a hydrocarbon reservoir by injecting a gas in the form of foam, comprising a step of determining a foam displacement model, which is a function of an optimal gas mobility reduction factor and of at least one water saturation-dependent interpolation function. The optimal gas mobility reduction factor is determined and constants of the water saturation-related interpolation function are calibrated from a plurality of apparent viscosity measurements for various foam quality values, and by use of a lamella model allowing which relates the lamella density as a function of the water saturation. The invention has an application to petroleum exploration and development.

22 Claims, 1 Drawing Sheet

(51) Int. Cl.
 C09K 8/584 (2006.01)
 E21B 47/06 (2012.01)
 E21B 47/10 (2012.01)

(56) References Cited

OTHER PUBLICATIONS

Abbaszadeh, Maghsood, "Methodology for development of laboratory-based comprehensive foam model for use in reservoir simulation of EOR" In SPE Annual Technical Conference and Exhibition. Society of Petroleum Engineers, 2016. (Year: 2016).*

Lotfollahi, Mohammad, Rouhi Farajzadeh, Mojdeh Delshad, Abdoljalil Varavei, and William R. Rossen. "Comparison of implicit-texture and population-balance foam models." Journal of Natural Gas Science and Engineering 31 (2016): 184-197. (Year: 2016).*

Zeng, Yongchao, Aarthi Muthuswamy, Kun Ma, Le Wang, Rouhi Farajzadeh, Maura Puerto, Sebastien Vincent-Bonnieu et al. "Insights on foam transport from a texture-implicit local-equilibrium model with an improved parameter estimation algorithm." Industrial & Engineering Chemistry Research 55, No. 28 2016 (Year: 2016).*

Gassara, Omar, Frederic Douarche, B. Braconnier, and B. Bourbiaux. "Calibrating and scaling semi-empirical foam flow models for the assessment of foam-based EOR processes (in heterogeneous reservoirs)." Transport in Porous Media 131, No. 1 (2020): 193-221. (Year: 2020).*

Dholkawala et al: "Application of fractional flow theory to foams in porous media", Journal of Petroleum Science and Engineering, Elsevier, Amsterdam, NL, vol. 57, No. 1-2 (May 1, 2007).

Afsharpoor A et al: "Mechanistic simulation of continuous gas injection period during surfactant-alternating-gas (SAG) processes using foam catastrophe theory", Chemical Engineering Science, Oxford, GB, vol. 65, No. 11, (Jun. 1, 2010).

Energy & Fuels et al: "Estimation of parameters for the simulation of foam flow through porous media: Part 1; the dry-out effect ACS Paragon Plus Environment Estimation of parameters for the simulation of foam flow through porous media: Part 1; the dry-out effect" (May 3, 2013).

Lotfollahi Mohammad et al: "Comparison of implicit-texture and population-balance foam models", Journal of Natural Gas Science and Engineering, vol. 31, (Mar. 9, 2016), pp. 184-197.

Preliminary Search Report dated Jul. 7, 2017 (3 Pages).

* cited by examiner

METHOD FOR DEVELOPING A HYDROCARBON RESERVOIR BY INJECTING A GAS IN THE FORM OF FOAM

CROSS REFERENCE TO RELATED APPLICATION

Reference is made to French patent application 17/50.940 filed on Feb. 3, 2017 which aforementioned application is incorporated hereby references in its entirety.

BACKGROUND OF THE INVENTION

Field of the Invention

The present invention relates to the exploitation of a fluid contained in an underground formation and more particularly to the enhanced recovery of such a fluid, such as a hydrocarbon fluid, using foam injection.

Description of the Prior Art

Development of a petroleum reservoir by primary recovery extracts, via a production well, the oil present in the reservoir due to the overpressure naturally prevailing within the reservoir. This primary recovery only enables access to a small amount of the oil contained in the reservoir which is, of the order of 10% to 15% at most.

To enable the continuation of oil extraction, secondary production methods are implemented when the reservoir pressure becomes insufficient to displace the oil still in place. Notably, a fluid is injected (reinjection of produced water, diluted or not, seawater or river water injection, or gas injection for example) into the hydrocarbon reservoir for to exerting within the reservoir an overpressure which is likely to cause the oil to flow into the production well(s). A usual technique in this context is water injection, also referred to as waterflooding, where large volumes of water are injected under pressure into the reservoir via injection wells. The injected water drives part of the oil encountered and pushes it towards one or more production wells. Secondary production methods such as waterflooding however allow only a relatively small part of the hydrocarbons in place to be extracted (typically on the order of 30%). This partial sweep is notably due to oil entrapment by capillary forces, to viscosity and density differences between the injected fluid and the hydrocarbons in place, and to heterogeneities at microscopic or macroscopic scales (pore scale and reservoir scale).

There are various techniques known as enhanced oil recovery (EOR) techniques for enabling recovery of the rest of the oil that remains in underground formations after implementing primary and secondary production methods. Examples thereof are techniques similar to those using the aforementioned water injection, but using a water comprising additives such as, for example, water-soluble surfactants (referred to as surfactant flooding). Using such surfactants notably induces a decrease in the water/oil interfacial tension, which provides more efficient entrainment of the oil trapped at pore constrictions.

Another known technique is enhanced recovery by injection of gases, miscible or not (natural gas, nitrogen or $CO_2$). This technique allows maintaining the pressure in the oil reservoir during development. It can also allow, in the case of miscible gases, mobilize the hydrocarbons in place and thus improve the flow rate thereof. A commonly used gas is carbon dioxide when it is available at low cost.

There are also alternative techniques based on the injection of foam into the oil reservoir. The foam results from an intimate mixture of gas and a surfactant solution. The latter is referred to as "foaming agent" hereafter. Due to its high apparent viscosity, foam is considered as an alternative to gas as the injection fluid employed in hydrocarbon reservoirs. The mobility of foam is thus reduced in relation to gas which tends to segregate and to rapidly break through to the production wells, notably in heterogeneous and/or thick reservoirs. Enhanced recovery using foam injection is particularly attractive because it requires injection of smaller volumes than in other enhanced recovery methods using non-foaming fluids.

BACKGROUND OF THE INVENTION

The following documents are mentioned in the description hereafter:

Alvarez, J. M., Rivas, H. J. and Rossen, W. R. 2001. Unified Model for Steady-State Foam Behavior at High and Low Foam Qualities. SPE Journal, 6(3):325-333.

Boeije, C. S. and Rossen, W. R. 2015. Fitting Foam-Simulation-Model Parameters to Data: I. Coinjection of Gas and Liquid. SPE Reservoir Evaluation & Engineering, 18(2), 264-272.

Bretherton F. P., 1961. The Motion of Long Bubbles in Tubes. Journal of Fluid Mechanics, 10(2):166.

Farajzadeh, R., Lotfollahi, M., Eftekhari, A. A., Rossen, W. R. and Hirasaki, G. J., 2015. Effect of Permeability on Implicit-Texture Foam Model Parameters and the Limiting Capillary Pressure. Energy & Fuels 29, 3011-3018 (ACS Publications).

Hirasaki, G. J. and Lawson J. B. 1985. Mechanisms of Foam Flow in Porous Media: Apparent Viscosity in Smooth Capillaries. SPE Journal, 25(2):176-190.

Kapetas, L., Vincent-Bonnieu, S., Farajzadeh, R., Eftekhari, A. A., Mohd-Shafian, S. R., Kamarul Bahrim, R. Z. and Rossen, W. R., 2015. Effect of Permeability on Foam-Model Parameters—An Integrated Approach from Coreflood Experiments through to Foam Diversion Calculations. 18th European Symposium on IOR, Dresden, 14-16 April.

Lotfollahi, M., Farajzadeh, R., Delshad, M., Varavei, A. and Rossen, W. R. 2016. Comparison of Implicit-Texture and Population-Balance Foam Models. Journal of Natural Gas Science and Engineering, 31, 184-197.

Ma, K., Lopez-Salinas, J. L., Puerto, M. C., Miller, C. A., Biswal, S. L., Hirasaki, G. J., 2013. Estimation of Parameters for the Simulation of Foam Flow through Porous Media. Part 1: The Dry-Out Effect. Energy & Fuels 27, 2363-2375 (ACS Publications).

Zeng, Y., Muthuswamy, A., Ma, K., Le, W. Farajzadeh, R., Puerto, M., Vincent-Bonnieu, S., Eftekhari, A. A., Wang, Y., Da, C., Joyce, J. C., Biswal, S. L. and Hirasaki, G. J. 2016. Insights on Foam Transport From a Texture-Implicit Local-Equilibrium Model with an Improved Parameter Estimation Algorithm. Industrial & Engineering Chemistry Research, 55(28):7819-7829, 2016.

Petroleum development of a reservoir determines the zones of the reservoir with the best oil potential, defines development schemes for these zones (in order to define the recovery type, the number and the positions of the development wells enabling optimal hydrocarbon recovery), drills development wells and, generally, sets up the necessary production infrastructures for reservoir development.

In the case of enhanced recovery using foam injection, the definition of an oil reservoir development scheme may require numerical simulation, as realistic as possible, of the flows in the presence of foam in the reservoir being considered. Such a simulation is carried out by use of a flow simulator comprising a foam displacement model.

Such a model can require evaluation of the performances of the foam in terms of mobility reduction. In general, this estimation involves laboratory experiments that measure the pressure drops upon the displacement of foam on the one hand, of water and non-foaming gas on the other, in an oil reservoir sample. This foam displacement model, representative of the flows at laboratory scale, is then calibrated at reservoir scale prior to performing the numerical flow simulations in order to predict the benefit provided by the injection of foam in terms of improvement in the displacement efficiency of the fluids in place.

The foam displacement models used in the industry are relatively simple models which, under the conditions of the foam, only simulate the effects of the foam in terms of mobility reduction, and not the foam generation-destruction processes. In general, foam displacement models depend non-linearly on many parameters (calibration constants). Determination of the parameters of these models therefore involves solving a non-linear inverse problem. However, the complexity of the displacement of a foam in a confined medium such as any natural porous medium makes calibration and modeling difficult because the large number of parameters that influence the foam can lead to indeterminations (multiple solutions).

The approaches proposed in documents (Ma et al., 2013; Boeije and Rossen, 2015; Zeng et al., 2016) determine simultaneously some parameters of the foam displacement model by use of a graphical approach, optionally complemented by a numerical adjustment.

The techniques disclosed in documents (Farajzadeh et al., 2015; Lotfollahi et al., 2016) determines the unknown parameters (calibration constants) of the foam displacement model with an iterative least-squares numerical approach. However, since the problem posed is non-linear in relation to these unknowns, there is a non-uniqueness of the solution or, in other words, the parameters which are determined are one solution among other possible solutions (see for example Kapetas et al., 2015).

Furthermore, French patent application FR-16/57,393 describes the sequential determination of the foam displacement model parameters, from various experimental data sets acquired on several rock-fluid-foam systems characterized notably by various foam qualities, various foaming agent concentrations and various oil saturations. The sequential character of the adjustment of the foam displacement model parameters allows minimizing the numerical adjustments, unlike methods which perform global adjustment, while trying to extract a maximum amount of information on the dynamic behavior of the foam from experimental data. The method then provides an empirical foam displacement model, which accurately reflects the experimental data.

SUMMARY OF THE INVENTION

The present invention describes a method for calibrating the foam displacement model used for reservoir simulation which accounts for physical laws relative to the foams and to the flow properties thereof. More precisely, the present invention describes the use of a lamella model as an intermediate for calibrating the foam displacement model from the experimental data. Thus, calibration being based on physical laws, the calibrated foam displacement model is more realistic and it allows more reliable production forecasts to be obtained using reservoir simulation. The method according to the invention thus contributes to better evaluation of foam-based enhanced recovery techniques for recovering oil in the reservoir considered.

The present invention thus relates to a method for developing an underground formation containing hydrocarbons, by injecting an aqueous solution comprising a gas in a form of a foam and using a flow simulator based on a displacement model of the gas in the form of foam. The displacement model being a function of an optimal mobility reduction factor of the gas and of at least one interpolation factor of the optimal mobility reduction factor. The at least one interpolation factor is a function of at least the water saturation and at least one constant.

According to the invention, the following steps are carried out from at least one sample of the formation, and from conventional relative aqueous phase permeability measurements and conventional relative gas permeability measurements:

A—Determining at least the optimal mobility reduction factor of the gas and the constant of the interpolation function according to at least the following stages:

i. carrying out injection at constant total rate, into the sample, of the gas in a foam form for a plurality of foam quality values, and measuring an apparent viscosity for each of the foam quality values;

ii. determining from the conventional relative permeability measurements and the apparent viscosity measurements for the plurality of foam quality values, a water saturation for each of the foam quality values;

iii. determining from a lamella model depending on the water saturation and the conventional relative gas and aqueous phase permeability measurements, a foam texture value for each of the foam quality values, iv. determining from the texture values, at least the optimal mobility reduction factor of the gas and the constant of the interpolation function of the optimal mobility reduction factor, B—determining from the displacement model and the flow simulator, an optimal development scheme for the reservoir and exploiting the hydrocarbons.

According to an embodiment of the invention, the apparent viscosity relative to a foam quality value can be determined from a pressure drop measurement in the sample for the foam quality value.

According to an embodiment of the invention, the lamella model can be a function relating foam texture to the water saturation according to a formula:

$$C_f n_f = \left[\frac{1-f_g}{f_g} \frac{k_{rgmax}(1-\overline{S}_w)^{\alpha_s}}{k_{rwmax}\overline{S}_w^{\alpha_w}} \mu_w - \mu_g\right] \left(\frac{f_g u_t}{\phi S_g}\right)^{1/3}$$

where $f_g$ is t quality of the foam, $\mu_w$ is viscosity of an aqueous phase, $\mu_g$ is velocity of a gas phase in continuous form, $u_t$ is a total velocity of the gas and of the solution, $C_f$ is a constant for the rock-fluids system being considered, $k_{rwmax}$ is a maximum value of the relative water permeability, $k_{rgmax}$ is a maximum value of relative gas permeability, $S_g$ is a gas saturation, $\square$ is porosity, $\alpha_w$ is an exponent of a powerfunction representative of the relative water permeability measurements, $\alpha_g$ is the exponent of the power function representative of the relative gas permeability measurements, and $\overline{S}_w$ is a normed water saturation.

According to an embodiment of the invention, the foam displacement model can further be a function of at least one interpolation function FE which depends on a parameter $V_k$ different from the water saturation and, prior to step B and for each of the interpolation functions $F_k$, stages i) to iii) are repeated for different values of parameter $V_k$ of the interpolation function $F_k$, and constants relative to the at least one interpolation function FE are determined from the optimal mobility reduction factor and from a mobility reduction factor relative to the interpolation function $F_k$.

Preferably, the parameter $V_k$ can be selected from among a foaming agent concentration, an oil saturation and a gas flow rate.

According to an embodiment of the invention, the mobility reduction factor $M_{mod}^k$ relative to function $F_k$ can be written with a formula:

$$F_k(V_k) = \frac{M_{mod}^k - 1}{M_{mod}^{opt} - 1}$$

where $M_{mod}^{opt}$ is the optimal mobility reduction factor.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

The following definitions are used:

Foam is a a phase dispersed in another phase by addition of a foaming agent to one of the two phases. One of the phases can be an aqueous solution and the other phase is a gas, such as natural gas, nitrogen or $CO_2$. The flow of foam in a porous medium is macroscopically (at the scale of a sample such as a core) comparable to the flow of a single homogeneous phase obeying Darcy's law for single phase flows but whose viscosity, referred to as "apparent viscosity" hereafter, is well above (of the order of 100 to 1000 times as high, or even more) that of the gas it is essentially made up of, A Lamella model, which is also known as bubble model, is a dynamic model based on a discontinuous representation of the foam and more precisely as a succession of lamellae (or bubbles) whose density (number of lamellae or bubbles per unit volume) determines the mobility reduction of the foam. Lamella models predict the effects of the foam in terms of mobility reduction and they also describe the lamellae generation and distribution mechanisms within porous media. Thus, the variable of these lamella models is the lamella density, and not the saturation as in reservoir models of conventional industrial use, Foam quality is the ratio of gas flow rate $u_g$ to the total flow rate of solution+gas. If the solution is an aqueous solution injected at a rate $u_w$, foam quality $f_g$ can be written as follows:

$$f_g = \frac{u_g}{(u_g + u_w)}$$

Thus defined, the respective flow rates of the solution and of the gas determine a value $f_g$ for the foam quality.

In general terms, the invention relates to a method for developing an underground formation containing hydrocarbons by injecting an aqueous solution comprising a gas in the form of foam, and notably by determining a development scheme for the hydrocarbons of the underground formation being studied. In particular, the method according to the invention determines the parameters of a displacement model for a gas in the form of foam.

The method according to the invention requires:

a sample of the underground formation being studied which is obtained by in-situ coring for example;

a flow simulator based on a displacement model of the gas in the form of foam (see below);

measurements of conventional relative permeability to the gas in non-foaming form and measurements of conventional relative aqueous phase permeability: it can be measurements performed specially for the method according to the invention (the specialist has thorough knowledge of the way such laboratory experiments should be conducted), but it can also be pre-established curves, or analytic functions calibrated from correlations which are known.

The method according to the invention requires a flow simulator comprising a foam displacement model. According to the invention, the foam displacement model is based on the assumption that the mobility of the gas present in the form of foam is reduced by a given factor under fixed formation and foam flow conditions. The formulation of such a model, used by many flow simulators, is in a modification of the relative gas permeabilities alone when the gas is present in the form of foam, which is expressed with a formula of the following type for a given gas saturation $S_g$:

$$k_{rg}^{FO}(S_g) = FM k_{rg}(S_g) \quad (1)$$

where $k_{rg}^{FO}(S_g)$ is the relative permeability to gas in the form of foam, expressed as the product of a function FM by the relative permeability to the non-foaming gas $k_{rg}(S_g)$ for the same gas saturation value $S_g$ (denoted by $S_g^{FO}$ hereafter). An assumption underlying the current foam models is that the relative water (or liquid, by extension) permeability is supposed to be unchanged, whether the gas is present as a continuous phase or as foam. Under this assumption, the gas mobility reduction functional denoted by FM hereafter is expressed by a formula of the type:

$$FM = \frac{1}{1 + (M_{mod}^{opt} - 1) * \prod_k F_k(V_k)} \quad (2)$$

where:

$M_{mod}^{opt}$ is an optimal mobility reduction factor, that is the ratio of the relative gas ($k_{rg}$) and foam ($k_{rg}^{FO}$) permeabilities under optimal conditions for gas mobility reduction, which are conditions where the value of terms $F_k(V_k)$ defined below is. That is:

$$M_{mod}^{opt} = \frac{k_{rg}(S_{g,opt}^{FO})}{k_{rg}^{FO}(S_{g,opt}^{FO})} = \frac{1}{FM_{opt}} \quad (3)$$

terms $F_k(V_k)$ (with k equal to or greater than 1) are values of the interpolation functions $F_k$ of the mobility reduction factor between value $M_{mod}^{opt}$ and 1, which depend each on a parameter $V_k$ relative to at least one characteristic of the foam, and which involve a number of calibration constants to be calibrated as explained below.

According to the invention, the foam displacement model comprises at least one interpolation function (conventionally denoted by $F_2$) depending on a relative parameter (denoted by $V_2$) corresponding to water saturation $S_w$. According to an embodiment of the invention, interpolation function $F_2$ is written with a formula of the type:

$$F_2 = \left[0.5 + \frac{\arctan[\theta_w(S_w - S_w^*)]}{\pi}\right] \quad (4)$$

According to this formulation, the constants of the foam displacement model are the optimal mobility reduction factor $M_{mod}^{opt}$ as defined according to Equation (2), constant $\theta_w$ that governs the transition (as a function of the water saturation) between the foaming and non-foaming states, and constant $S_w^*$ representing the transitional water saturation between stable and unstable foaming states.

According to an embodiment of the invention, the gas mobility reduction functional, denoted by FM, comprises four interpolation functions $F_k(V_k)$ and each of these functions comprises two constants to be calibrated from experimental data. According to an embodiment of the invention wherein the gas mobility reduction functional comprises four interpolation functions $F_k(V_k)$, interpolation function $F_1$ relative to parameter $V_1 = C_s^w$ (foaming agent concentration $C_s^w$) by a formula of the type:

$$F_1 = \left(\frac{\text{Min}(C_s^w, C_s^{w-ref})}{C_s^{w-ref}}\right)^{e_s} \quad (5)$$

for which the constants to be calibrated are exponent $e_s$ and constant $C_s^{w-ref}$ that corresponds to the foaming agent concentration under optimal reference conditions;

interpolation function $F_2$ relative to parameter $V_2 = S_w$ (water saturation), as defined above (see Equation (4) notably), interpolation function $F_3$ relative to parameter $V_3 = S_o$ (oil saturation) by a formula:

$$F_3 = \left(\frac{\text{Max}[0; S_o^* - S_o]}{S_o^*}\right)^{e_o} \quad (6)$$

where $S_o^*$ is oil saturation beyond which the foam loses all ability to reduce the gas mobility, and exponent $e_o$ is a constant to be determined, interpolation function $F_4$ relative to parameter $V_4 = N_c$ (related to the gas flow rate) and defined by a formula of the type:

$$F_4 = \left(\frac{N_c^*}{\text{Max}(N_c, N_c^*)}\right)^{e_c} \quad (7)$$

where:

$N_c$ is a dimensionless number expressing a ratio between viscous forces (related to the gas flow) and capillary forces at local scale This ratio can for example be defined with a formula of the type:

$$N_c = \frac{\mu_g u_g}{\phi S_g \sigma_{wg}(C_s^w)} = \frac{\mu_g f_g u_t}{\phi S_g \sigma_{wg}(C_s^w)}$$

the variables involved in the calculation of $N_c$ are porosity $\phi$ and gas saturation $S_g$, foam quality $f_g$, flow rate $u_t$ (total rate of flow of the two phases making up the foam), water-gas interfacial tension $\sigma_{gw}$ (which is a function of the foaming agent concentration $C_s^w$ of the aqueous phase), and gas viscosity $\mu_g$. Exponent $e_c$ can be fixed a priori, for example from a physical lamella model, or it can be calibrated, $N_c^*$ is a reference value of capillary number $N_c$, calculated for the reference pressure gradient (equal to the applied minimum gradient $\nabla P_{min}$ allowing foam to be generated in a porous medium), that is for the minimum quality allowing foam to be generated:

$$N_c^* = \frac{\mu_g f_g^{min} u_t}{\phi S_g(f_g^{min}) \sigma_{wg}(C_s^w)}.$$

According to an embodiment of the invention wherein the foaming agent concentration is not variable, function $F_4$ can also be written in the form as follows:

$$F_4 = \left(\frac{N_c^*}{\text{Max}(N_c, N_c^*)}\right)^{e_c} = \left(\frac{\frac{f_g^{min}}{S_g(f_g^{min})}}{\text{Max}\left[\frac{f_g}{S_g(f_g)}, \frac{f_g^{min}}{S_g(f_g^{min})}\right]}\right)^{e_c}.$$

In general terms, the present invention determines in a reliable manner, based on physical considerations, the parameters of a foam displacement model as a function of an optimal gas mobility reduction factor and of at least one water saturation-related interpolation function of the optimal mobility reduction factor.

According to an embodiment of the invention, at least the following parameters are determined:

optimal gas mobility reduction factor $M_{mod}^{opt}$ according to Equation (2), calibration constants $\theta_w$ and $S_w^*$ of function $F_2$ (Equation (4)).

According to an embodiment of the invention where functional FM which is defined in Equation (2), involves interpolation functions $F_1$, $F_2$, $F_3$ and $F_4$ defined in Equations (4) to (7), the foam displacement model is determined by calibrating optimal mobility reduction factor $M_{mod}^{opt}$ (see Equation (2)) and the constants of interpolation function $F_2$ (that is constants $\theta_w$ and $S_w^*$ of Equation (4)) for given parameter values of functions $F_1$, $F_3$ and $F_4$, that is for a given foaming agent concentration, for a given oil saturation and for a given gas flow rate.

The method according to the invention comprises at least the following steps:
1. Measuring the apparent viscosity as a function of foam quality
2. Determining the water saturation as a function of foam quality
3. Determining the bubble density as a function of water saturation
4. Determining the parameters of the foam displacement model
5. Exploiting the hydrocarbons of the formation.

The various steps of the method according to the invention are detailed hereafter.

These steps are applied for a given (preferably high) foaming agent concentration and in the absence of oil, that is under optimal conditions ensuring optimal foam performance (quantified by optimal mobility reduction factor $M_{mod}^{opt}$ in Equation (2)). At least the optimal mobility reduction factor is then determined, as well as the calibration constants of the water saturation-related interpolation function.

According to an embodiment of the method according to the invention, steps 1 to 3 are repeated for example for various foaming agent concentrations and at least one of for various oil saturations and for various gas flow rates, in order to additionally determine the constants relative to the interpolation functions relative to other parameters than the water saturation, such as for example the constants involved in Equations (5), (6) and (7).

Steps 2 to 5 can be carried out numerically using a computer.

1. Measuring the Apparent Viscosity as a Function of Foam Quality

In this step, laboratory experiments are conducted in order to determine an apparent viscosity value for various foam quality values. More precisely, this step comprises injecting into a rock sample taken from the geological reservoir being studied a foam for different foam quality values and measuring a pressure drop for each foam quality value. An apparent viscosity value is then determined for each of the foam quality values from these pressure drop measurements.

According to an embodiment of the invention, the foaming agent selected for implementing the invention is dissolved in an aqueous solution at a fixed concentration, of the order of 1 g/l for example. The solution thus prepared and the gas ($CO_2$ for example) are injected into the rock sample. Injections are performed for various foam quality values.

According to an embodiment of the invention, foam quality $f_g$ at a fixed (gas+solution) flow rate is varied and a pressure drop (that is a pressure difference between upstream and downstream from the rock sample being considered) is measured for each foam quality value $f_g$. An apparent viscosity $\mu_{app}$ of the foam is determined from the pressure drop measurements, for each foam quality value $f_g$, with a formula of the type:

$$\mu_{app} = \frac{k \nabla P}{u_t}$$

where $$\nabla P = \frac{\Delta P}{L}$$

is the measured pressure gradient under steady state conditions of flow through the porous medium sample for a given foam quality value $f_g$. L is the length of the rock sample being considered, $\Delta P$ is the pressure drop measured between upstream and downstream from this sample for the foam quality value $f_g$ being considered, $u_t$ is the total (gas+solution) rate of flow and k is the permeability of the rock sample.

2. Determining the Water Saturation as a Function of Foam Quality

This step determines a water saturation value for each foam quality value for which an apparent viscosity measurement was performed (see previous step). This step requires relative aqueous phase permeability measurements $k_{rw}(S_w)$, which are not variable whether the foam is present or not. It is well known that these measurements are distributed along a curve referred to as relative permeability curve. According to an embodiment of the invention, instead of performing relative permeability measurements in order to determine a relative permeability curve, pre-established curves are used, such as the curves defined analytically (by power functions) in document (Lotfollahi et al., 2016).

According to the invention, water saturation $S_w$ of the porous medium under steady state foam flow conditions is determined by inversion of curve $k_{rw}(S_w)$. Thus, according to this embodiment, water saturation $S_w$ is determined with a formula:

$$S_w = k_{rw}^{-1}\left(\frac{(1-f_g)\mu_w}{\mu_{app}}\right) \tag{8}$$

According to an embodiment of the invention, the relative permeability curves are analytically represented by power functions of the normed saturation. The relative water permeability curve can for example be written in the form:

$$k_{rw}(\overline{S_w}) = k_{rwmax}\overline{S_w}^{\alpha_w} \tag{9}$$

where $\overline{S_w}$ is the normed water saturation between 0 and 1 defined by $$\overline{S_w} = \frac{S_w - S_{wi}}{1 - S_{wi} - S_{gr}},$$

where $S_{wi}$ and $S_{gr}$ are the minimum water and gas saturations respectively, $\alpha_w$ is the relative water permeability exponent and $k_{rwmax}$ is the maximum relative water permeability value. Similarly, by way of example, relative gas permeability curve $k_{rg}$ can be written as a function of $\overline{S_w}$:

$$k_{rg}(\overline{S_w}) = k_{rgmax}(1-\overline{S_w})^{\alpha_g} \tag{10}$$

where $k_{rgmax}$ is the maximum relative gas permeability value. The normed water saturation can then be deduced therefrom using a formula of the type:

$$\overline{S_w} = \left(\frac{f_w \mu_w}{k_{rwmax}\mu_{app}}\right)^{\frac{1}{\alpha_w}} \tag{11}$$

where $f_w=1-f_g$, $\mu_w$ is the viscosity of the water and $\mu_{app}$ is the apparent viscosity as determined in the previous step, for a given foam quality value $f_g$. The water and gas saturations can then be obtained for each foam quality value $f_g$, using formulas of the type:

$$S_w = S_{wi} + (1 - S_{wi} - s_{gr})\overline{S_w} \quad (12)$$

$$S_g = 1 - S_w. \quad (13)$$

Thus, at least one water saturation value is obtained for each foam quality value at the end of this step.

3. Determining the Bubble Density as a Function of Water Saturation

A lamella density (or texture) is determined in this step for each foam quality value, from a lamella model depending on the water saturations and from the relative aqueous phase and gas permeability measurements. Lamella models predict the effects of the foam in terms of mobility reduction and they also describe the lamella generation and distribution mechanisms within porous media. Notably, the texture is a physical quantity representative of the ability of the foam to reduce the gas mobility.

According to an embodiment of the invention, the lamella model is a viscosity evolution law $\mu_g$ for the gas flowing in the form of foam as a function of the lamella density (or foam texture) $n_f$ of the form:

$$\mu_g^{fo} = \mu_g + \frac{C_f n_f}{v_g^{1/3}} \quad (14)$$

where $v_g$ is the local or interstitial (intrapore) velocity of the gas phase in discontinuous form within the foam, $\mu_g$ is the velocity of the gas phase in continuous form and $C_f$ is a constant for the rock-fluid system being considered. This rheological law for the gas flowing in the form of bubbles is notably described in documents (Bretherton, 1961) and (Hirasaki and Lawson, 1985) relating to the flows of one or more bubbles within capillary tubes.

Such a lamella model allows relating saturation (characteristic parameter of multiphase flows in porous media) to texture (characteristic parameter of the foam). The relation between these characteristic parameters is obtained by writing the ratio of the filtration rates of the two phases, by knowing that $u_g = f_g u_t$ and $u_w = (1-f_g)u_t$:

$$\frac{u_g}{u_w} = \frac{f_g}{1-f_g} = \frac{k_{rg}(\overline{S_w})}{k_{rw}(\overline{S_w})} \frac{\mu_w}{\mu_g^{fo}} = \frac{k_{rg}(\overline{S_w})}{k_{rw}(\overline{S_w})} \frac{\mu_w}{\mu_g + \frac{C_f n_f}{v_g^{1/3}}} \quad (15)$$

According to an embodiment of the invention where the relative permeability curves are modeled as power functions of the normed saturation as described in Equations (9) and (10), Equation (15) can be rewritten as follows:

$$\frac{u_g}{u_w} = \frac{f_g}{1-f_g} = \frac{k_{rgmax}(1-\overline{S_w})^{\alpha_g}}{k_{rwmax}\overline{S_w}^{\alpha_w}} \frac{\mu_w}{\mu_g + \frac{C_f n_f (\phi S_g)^{1/3}}{u_g^{1/3}}} \quad (16)$$

We can then deduce from Equation (16):

$$C_f n_f = \left[\frac{1-f_g}{f_g} \frac{k_{rgmax}(1-\overline{S_w})^{\alpha_g}}{k_{rwmax}\overline{S_w}^{\alpha_w}} \mu_w - \mu_g\right]\left(\frac{f_g u_t}{\phi S_g}\right)^{1/3}, \quad (17)$$

with $S_g = 1 - S_w$.

Thus an expression for texture $n_f$ is obtained that depends on the water saturation. We can thus assign, for any foam quality value, a value for texture $n_f$ (up to the value of constant $C_f$) as a function of a single saturation value. Thus, this step leads to the transcription of the experimental information into a law relating the number of lamellae $n_f$ to water saturation $S_w$ deduced from the flow measurements for the foam being considered in the porous medium being considered for various foam quality values.

According to an embodiment of the invention, a normed texture $\overline{n}_f$, is further determined that is $$\overline{n}_f = \frac{n_f}{n_{fmax}},$$

which can also be written as follows:

$$\overline{n}_f = \frac{C_f n_f}{\underset{i=1,n}{\text{Max}}(C_f n_f)_i} \quad (18)$$

Values $(C_f n_f)$ $i=1, 2 \ldots, n$ (n=number of foam quality values) are calculated as explained in the previous step. $C_f$ is a constant that can be estimated from the maximum value of product $C_f n_f$, equal to $C_f n_{fmax}$, where $n_{fmax}$ is the maximum texture estimated as the inverse of the characteristic volume of the foam bubbles. This volume is calculated from the characteristic threshold radius between pores of the medium being studied. This threshold radius can be formulated as $$\sqrt{\frac{8k}{\phi}}$$

according to the simplified representation of a porous medium of porosity $Q$ and of permeability k as a capillary assembly.

4. Determining the Parameters of the Foam Displacement Model

This step determines, from the lamella model as described in the previous step and from the relative gas and aqueous phase permeability measurements, the parameters of a foam displacement model depending on at least one optimal gas mobility reduction factor and on a water saturation-related interpolation function of the optimal mobility reduction factor (see Equations (1), (2), (3) and (4)).

According to an embodiment of the invention in which the water saturation-related interpolation function of the foam displacement model is written according to Equation (4), the displacement model parameters are determined as follows:

Determining $S_w^*$:

As established in the previous step, the texture only depends on the water saturation. Moreover, from a physical point of view, it is well known that there is a critical water saturation $S_w^*$ below which the foam bubbles combine (coalesce), that is the normed texture rapidly drops from 1 to 0.

According to an embodiment of the invention, critical saturation $S_w^*$ is defined by the water saturation for a normed texture of 0.5 (median normed texture value):

$$S_w^* = \overline{n}_f^{-1}(0.5) \quad (19)$$

where $\bar{n}_f^{-1}$ is the inverse of normed texture $\bar{n}_f$ (see previous step).

Thus, constant $S_w^*$ involved in the equation of interpolation function $F_2$ as defined in Equation (4) can be directly determined from texture $n_f$, which itself is directly determined from experimental measurements (see steps 1 and 2 described above).

Determining $\theta_w$:

Constant $\theta_w$, which appears in the expression of interpolation function $F_2$ as defined in Equation (4), allows transcribing the more or less rapid transition of the normed texture from 0 to 1 when the water saturation increases (or when the gas saturation decreases). Moreover, from a physical point of view, it is noted that the foam disappears, that is the normed texture $\bar{n}_f$ cancels out, for a water saturation $S_{wmin}$ below critical saturation $S_w^*$ but however in the neighborhood of critical saturation $S_w^*$.

Furthermore, the experimental data allows determination of a representative function of texture $n_f$ (up to a multiplicative constant) and the corresponding saturation for various values of foam quality $f_g$. However, very high quality measurements such that texture $n_f$ tends towards 0 are not accessible (or reliable).

According to an embodiment of the invention, constant $\theta_w$ is defined with a formula $$\theta_w \geq \frac{10}{S_{wopt} - S_w^*}. \tag{20}$$

where $S_{wopt}$ is the water saturation maximizing the apparent viscosity (or the texture) of the foam, and beyond which the latter decreases until it comes close to the viscosity of the continuous gas phase (corresponding to nf=0).

Preferably, constant $\theta_w$ is defined as contained in the following interval:

$$\frac{10}{S_{wopt} - S_w^*} \leq \theta_w \leq \frac{100}{S_{wopt} - S_w^*} \tag{21}$$

Determining optimal mobility reduction factor $M_{mod}^{opt}$

From a physical point of view, the gas mobility decreases when the foam quality increases between a minimum value and a value $f_g^{opt}$, which is referred to as optimal foam quality, beyond which the foam degrades.

According to an embodiment of the invention where the lamella model is defined according to Equation (14), it can be shown that the gas mobility reduction factor is expressed by a formula of the type:

$$M_{mod}^{opt} = 1 + \frac{C_f n_{fmax}}{\mu_g (v_g^{min})^{1/3}} \tag{22}$$

This expression of the optimal (i.e. maximum) mobility reduction factor is consistent with physics, that is it is maximized for a lamella density (or foam texture) equal to the maximum density $n_{fmax}$ and the minimum velocity at which such a foam can be generated.

Thus, at the end of this step, values for the parameters involved in a foam displacement model depending on an optimal gas mobility reduction factor and at least one water saturation-related interpolation function of the optimal mobility reduction factor are available.

According to an embodiment of the invention, the foam displacement model involves at least another interpolation function FE than the one depending on the water saturation, steps 1 to 3 described above which are repeated for different values of parameter $V_k$ of an interpolation function $F_k$, and the constants specific to this other interpolation function are determined from the optimal mobility reduction factor as determined at the end of step 4 above and from a mobility reduction factor relative to the interpolation function considered.

According to an embodiment of the invention, optimal mobility reduction factor $M_{mod}^k$ associated with parameter $V_k$ of an interpolation function $F_k$ can be written with a formula:

$$F_k(V_k) = \frac{M_{mod}^k - 1}{M_{mod}^{opt} - 1} \tag{23}$$

where $M_{mod}^{opt}$ is the optimal mobility reduction factor determined at the end of step 4 described above.

Byway of illustration, determination of the constants of function $F_1$ as described in Equation (5), relative to the foaming agent concentration of the foam, can be articulated as follows:

a plurality of values $C_s^w$ relative to the foaming agent concentration in the constituent aqueous phase of the foam studied is defined. According to an embodiment of the invention, a maximum value $C_s^{w\text{-}ref}$ (beyond which the method is obviously no longer economically interesting) and a predetermined number of intermediate values between 0 and this maximum value are defined, for each of the concentration values thus selected, the apparent foam viscosity measurements as a function of the foam quality, as described in step 1, are repeated, i.e. injections are carried out at a fixed total rate and at a fixed concentration for different foam quality values;

steps 2 and 3 as described above are then applied to the apparent viscosity measurements thus obtained, that is the water saturations as a function of the foam quality are determined as described in step 2 above and then the corresponding bubble densities are determined, for example by calculating the values of $C_f n_f$ as a function of quality $f_g$ as described in step 3. Knowing that the maximum texture value $n_{fmax}$ is not variable for a given porous medium, the maximum value of the product $C_f n_f$ allows determination of a new value for $C_f$ that expresses the impact of the concentration on the performance of the foam;

a mobility reduction factor $M_{mod}^1$ associated with interpolation function $F_1$ for each of the foaming agent concentration values $C_s^w$ is then determined using Equation (22) for example. From the values of $M_{mod}^1$ for the various foaming agent concentration values $C_s^w$ and from optimal mobility reduction factor $M_{mod}^{opt}$ as determined at the end of step 4, exponent $e_s$ allowing best calibration of the curve described is then determined by a formula of the type (and directly deduced from Equations (23) and (5)):

$$M_{mod} - 1 = (M_{mod}^{opt} - 1) * \left(\frac{\text{Min}(C_s^w, C_s^{w\text{-}ref})}{C_s^{w\text{-}ref}}\right)^{e_s} \tag{24}$$

According to an embodiment of the invention wherein the foam displacement model involves at least two other interpolation functions that the one depending on the water saturation, the constants associated with these other interpolation functions are determined as described above, sequentially, interpolation function by interpolation function.

5. Exploiting the Hydrocarbons of the Formation.

This stage determines at least one development scheme for the hydrocarbons contained in the formation. In general terms, a development scheme comprises a number, a geometry and a location (position and spacing) for the injection and production wells. A hydrocarbon development scheme however also comprises the definition of an enhanced recovery type. In the case of enhanced hydrocarbon recovery by injection of a gas in the form of foam, the development scheme can also be defined by a type of gas injected into the formation studied and/or by the type of foaming agent added to this gas, by the amount of foaming agent, etc. A hydrocarbon reservoir development scheme must for example enable a high rate of recovery of the hydrocarbons trapped in the geological reservoir, over a long development duration, requiring a limited number of wells.

According to the invention, determining the development scheme for the hydrocarbons in the formation is achieved by use of a flow simulation using the foam displacement model established in the previous steps. An example of a flow simulator (also referred to as reservoir simulator) which allows a foam displacement model to be taken into account, is the PumaFlow software (IFP Energies nouvelles, France). According to the invention, at any time t of the simulation, the flow simulator solves all of the flow equations specific to each grid cell and delivers solution values to the unknowns (saturations, pressures, concentrations, temperature, etc.) predicted at this time t. This solution provides knowledge of the amounts of oil produced and of the state of the reservoir (distribution of pressures, saturations, etc.) at the time being considered. According to an embodiment of the invention, various development schemes are defined for the fluid of the formation being studied and the flow simulator including the foam displacement model determined at the end of step 3 allows estimating, for example, of the amount of hydrocarbons produced according to each of the various development schemes, the representative curve of the evolution of production with time in each well, etc.

Then, once the development scheme is defined, the hydrocarbons trapped in the formation are exploited in accordance with this development scheme, notably by drilling the injection and production wells of the determined development scheme, to produce the hydrocarbons, and by setting up the production infrastructures required for development of the reservoir.

It is understood that the development scheme can evolve over the duration of the exploitation of a geological reservoir, according to reservoir-related knowledge acquired during development, to improvements in the various technical fields involved in the exploitation of a hydrocarbon reservoir (advancements in the field of drilling, of enhanced oil recovery for example).

Example Embodiment

The features and advantages of the method according to the invention will be clear from reading the application example hereafter.

More precisely, the present invention was applied to the measurements of one of the tests described in document (Alvarez et al., 2001). The test was conducted on a gritty rock representative of a reservoir where hydrocarbons would be trapped and of which samples were taken by coring.

Enhanced recovery of liquid hydrocarbons from such a reservoir is experimentally simulated by displacement of a gas (nitrogen in the present case) injected in the form of foam made up of a mixture of this gas with an aqueous phase containing a foaming agent (anionic surfactant in the present case) at the concentration of 1 wt. %.

This example embodiment utilizes analytic functions for relative gas and water permeabilities predetermined for this type of rock (a sandstone in the present case) and described in the literature, in document (Lotfollahi et al., 2016) for example.

The characteristics of the rock-fluid-foam system relative to these measurements are given in Table 1.

TABLE 1

| Porosity (%) | 0.18 |
| --- | --- |
| Permeability (mD) | 530 |
| Gas viscosity $\mu_g$ (1 mPa · s.) | 0.02 |
| Water viscosity $\mu_w$ (1 mPa · s.) | 0.7 |
| Maximum relative gas permeability $k_{rgmax}$ | 0.94 |
| Maximum relative water permeability $k_{rwmax}$ | 0.2 |
| Exponent $\alpha_w$ of curve $k_{rw}$ | 4.2 |
| Exponent $\alpha_g$ of curve $k_{rg}$ | 1.3 |
| Minimum water saturation $S_{wi}$ | 0.2 |
| Minimum gas saturation $S_{gr}$ | 0.2 |
| Estimated foam bubble radius $\sqrt{\frac{8k}{\phi}}$ (m) | 4.82176E−06 |
| Maximum texture $n_{fmax}$ (m$^{-3}$) | 2.12958E+15 |
| Rate of flow gas + solution $u_t$ (m/s) | 8.81944E−06 |

Pressure drop measurements at the fixed total velocity $u_t$ as described in step 1 of the present invention are performed for foam quality values ranging between 0.25 and 0.90. Apparent viscosity values are determined from these pressure drop measurements for each of the foam quality values. These apparent viscosity values are presented in the first two lines of Table 2.

TABLE 2

| $f_g$ | 0.25 | 0.30 | 0.37 | 0.45 | 0.50 | 0.60 | 0.67 | 0.76 | 0.80 | 0.86 | 0.90 |
| --- | --- | --- | --- | --- | --- | --- | --- | --- | --- | --- | --- |
| $\mu_{app}$, cp | 550 | 600 | 660 | 730 | 760 | 830 | 870 | 920 | 800 | 600 | 400 |
| $S_w$ | 0.368 | 0.362 | 0.354 | 0.346 | 0.341 | 0.331 | 0.324 | 0.313 | 0.312 | 0.310 | 0.312 |
| $C_fn_f$ Pa · s · (m/s)$^{1/3}$ | 0.0362 | 0.0355 | 0.0346 | 0.0343 | 0.0336 | 0.0333 | 0.0330 | 0.0328 | 0.0276 | 0.0198 | 0.0128 |
| $n_f/n_{fmax}$ | 1.000 | 0.981 | 0.955 | 0.946 | 0.928 | 0.919 | 0.910 | 0.905 | 0.763 | 0.547 | 0.353 |

Figure 1:
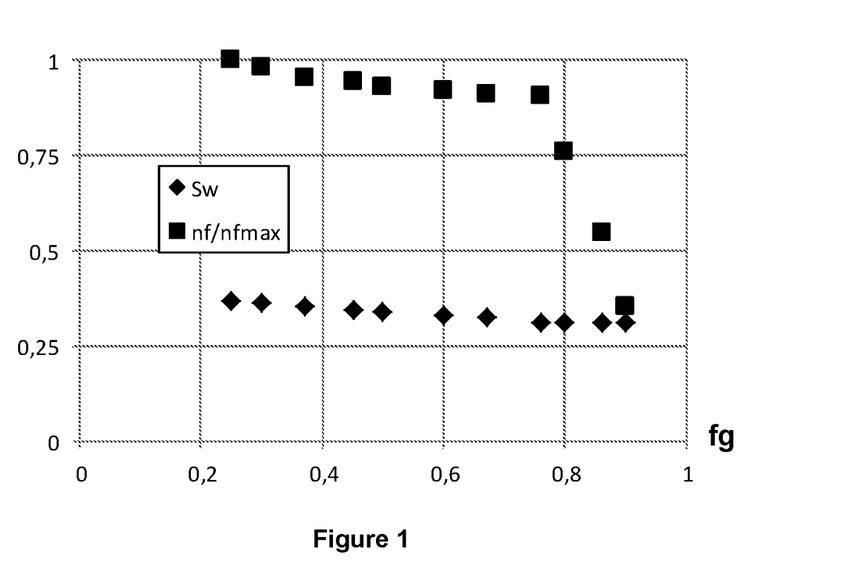
FIG. 1 shows evolution of water saturation and of normed texture as a function of foam quality.
Figure 2:
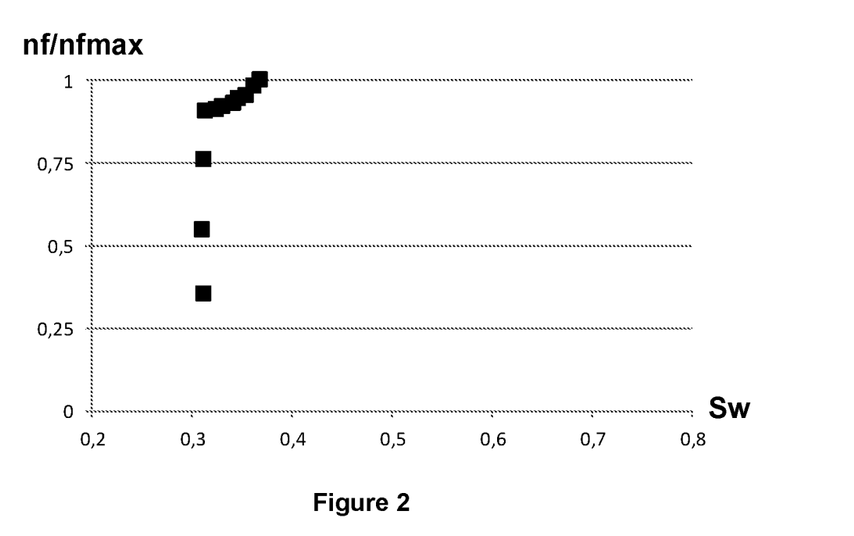
FIG. 2 shows evolution of the normed texture as a function of the water saturation.

Water saturation Sw and the texture are determined from these apparent viscosity values for each of the foam quality values, as described in steps 2 and 3 of the present invention. The results of these steps are given in the last three lines of Table 2, and in FIGS. 1 and 2. Notably FIG. 1 shows the evolution of saturation (Sw) and the evolution of normed texture (nf/nfmax) as a function of foam quality (fg). FIG. 2 shows the evolution of normed texture (nf/nfmax) as a function of water saturation (Sw).

It cant be noted that the texture of the foam remains quasi-constant over a wide quality interval ranging from 0.25 to 0.75 approximately and that, beyond, for higher qualities from 0.76 to 0.9, the texture of the foam decreases rapidly, which actually translates into a decrease in the apparent viscosity of the foam from 920 to 400 cp. Foam quality $f_{gopt}$ that maximizes the apparent viscosity of the foam is thus 0.76 in the present case. In parallel, it appears that the water saturation varies little over the entire foam quality interval explored by these measurements. FIG. 2 thus shows, in a complementary manner with FIG. 1, that the texture of the foam can vary considerably without the water saturation of the porous medium being considerably modified.

These results illustrate the fact that the mobility reduction of the gas injected in the form of foam (mobility reduction measured by the apparent viscosity) is related in a much more significant way to the texture of the foam (number of bubbles or lamellae) than to the saturation of the porous medium: in other words, the performance of a foam in a porous medium is more readily modeled (i.e. calibration of the model is easier) via the intermediate texture variable than via the saturation variable alone. The advantage provided by the use of a lamella model as the intermediate for calibrating the foam displacement models from experimental data is thus demonstrated.

From the texture values that are determined, it is described above in step 4, values are determined of the parameters involved in the foam displacement model depending on at least one optimal gas mobility reduction factor and a water saturation-related interpolation function of the optimal mobility reduction factor (see Equations (1), (2), (3) and (4)). The values of these parameters are as follows:

optimal gas mobility reduction factor $M_{mod}^{opt}$: 67,500
critical saturation $S_w^*$: 0.31
constant $\theta_w$: greater than or equal to 10/(0.368−0.310)=175, and more preferably ranging between 10/(0.368−0.310)=175 and 100/(0.368−0.310)=1750.

The value of $S_w^*$ thus obtained from apparent viscosity measurements and from a physical model of lamella model type is the same as that obtained by numerical adjustments as described in document (Lotfollahi et al., 2016). The value determined for mobility reduction factor $M_{mod}^{opt}$ is also of the same order of magnitude as those obtained by numerical adjustment (iterative least-squares method) of the foam models of other known simulators, such as UT and STARS referenced by Lotfollahi et al. (2016) concerning modeling of these tests.

Thus, the method according to the invention enables parametrization of a foam displacement model from experimental data interpreted according to a representative model of the physics of foam (bubble assembly). Using a physical lamella model as an intermediate for foam model calibration provides a foam displacement model that is physically valid.

The invention claimed is:

1. A method for developing an underground formation containing hydrocarbons, by injecting an aqueous solution comprising a gas in a form of a foam and using a flow simulator based on a displacement model of the gas in the form of a foam, the displacement model being a function of an optimal mobility reduction factor of the gas and of at least one interpolation factor of the optimal mobility reduction factor, the at least one interpolation factor being a function of at least water saturation and at least one constant, using at least one sample of the formation, involving relative aqueous phase permeability measurements and relative gas permeability measurements comprising:

A. determining at least the optimal mobility reduction factor of the gas and the constant of the at least one interpolation function by:
 i. carrying out an injection of the gas at a constant rate into the sample of the formation for a plurality of foam quality values and measuring an apparent viscosity for each of the foam quality values;
 ii. determining from the relative aqueous phase permeability measurements, the relative gas permeability measurements and the apparent viscosity measurements for the plurality of foam quality values, a water saturation for each of the foam quality values,
 iii. determining from a lamella model depending on the water saturation, the relative gas permeability measurements and the relative aqueous phase permeability measurements, a foam texture value for each of the foam quality values; and
 iv. determining from the foam texture values, at least the optimal mobility reduction factor of the gas and the constant of the interpolation function of the optimal mobility reduction factor; and
B. determining from the displacement model and the flow simulator, an development scheme of the hydrocarbons contained in the formation and exploiting the hydrocarbons from the formation.

2. A method as claimed in claim 1, comprising: determining the apparent viscosity relative to a foam quality value from a pressure drop measurement in the sample for the foam quality value.

3. A method as claimed in claim 2, wherein the lamella model is a function relating foam texture $n_f$ to water saturation $S_w$ according to a formula:

$$C_f n_f = \left[\frac{1-f_g}{f_g}\frac{k_{rgmax}(1-\overline{S_w})^{\alpha_g}}{k_{rwmax}\overline{S_w}^{\alpha_w}}\mu_w - \mu_g\right]\left(\frac{f_g u_t}{\phi S_g}\right)^{1/3}$$

where $f_g$ is the quality of the foam, µw is the viscosity of an aqueous phase, µg is the velocity of the gas phase in continuous form, $u_t$ is the total velocity of the gas and of the solution, Cf is a constant for the rock-fluids system considered, $k_{rwmax}$ is a maximum value of relative water permeability, $k_{rgmax}$ is a maximum value of the relative gas permeability, $S_g$ is a gas saturation, □ is a porosity, $\alpha_w$ is an exponent of the power function representative of the relative water permeability measurements, $\alpha_g$ is an exponent of a power function representative of a relative gas permeability measurements, and $\overline{S_w}$ is a normed water saturation.

4. A method as claimed in claim 3, wherein the foam displacement model further is a function of at least one interpolation function $F_k$ depending on a parameter $V_k$ different from water saturation and wherein, prior to step B and for each of the interpolation functions $F_k$, steps i) to iii) are repeated for different values of the parameter $V_k$ of the interpolation function $F_k$, and constants relative to the interpolation function $F_k$ are determined from the optimal mobility reduction factor and from a mobility reduction factor relative to the interpolation function $F_k$.

5. A method as claimed in claim 4, wherein the parameter $V_k$ is selected from a foaming agent concentration, an oil saturation and a gas flow rate.

6. A method as claimed in claim 5, wherein a mobility reduction factor $M_{mod}^k$ relative to function $F_k$ is expressed by a formula:

$$F_k(V_k) = \frac{M_{mod}^k - 1}{M_{mod}^{opt} - 1}$$

where $M_{mod}^{opt}$ is the optimal mobility reduction factor.

7. A method as claimed in claim 4, wherein a mobility reduction factor $M_{mod}^k$ relative to function $F_k$ is expressed by a formula:

$$F_k(V_k) = \frac{M_{mod}^k - 1}{M_{mod}^{opt} - 1}$$

where $M_{mod}^{opt}$ is the optimal mobility reduction factor.

8. A method as claimed in claim 2, wherein the foam displacement model further is a function of at least one interpolation function $F_k$ depending on a parameter $V_k$ different from water saturation and wherein, prior to step B and for each of the interpolation functions $F_k$, steps i) to iii) are repeated for different values of the parameter $V_k$ of the interpolation function $F_k$, and constants relative to the interpolation function $F_k$ are determined from the optimal mobility reduction factor and from a mobility reduction factor relative to the interpolation function $F_k$.

9. A method as claimed in claim 8, wherein the parameter $V_k$ is selected from a foaming agent concentration, an oil saturation and a gas flow rate.

10. A method as claimed in claim 9, wherein a mobility reduction factor $M_{mod}^k$ relative to function $F_k$ is expressed by a formula:

$$F_k(V_k) = \frac{M_{mod}^k - 1}{M_{mod}^{opt} - 1}$$

where $M_{mod}^{opt}$ is the optimal mobility reduction factor.

11. A method as claimed in claim 8, wherein a mobility reduction factor $M_{mod}^k$ relative to function Fk is expressed by a formula:

$$F_k(V_k) = \frac{M_{mod}^k - 1}{M_{mod}^{opt} - 1}$$

where $M_{mod}^{opt}$ is the optimal mobility reduction factor.

12. A method as claimed in claim 1, wherein the lamella model is a function relating foam texture $n_f$ to water saturation $S_w$ according to a formula:

$$C_f n_f = \left[ \frac{1 - f_g}{f_g} \frac{k_{rgmax}(1 - \overline{S_w})^{\alpha_g}}{k_{rwmax}\overline{S_w}^{\alpha_w}} \mu_w - \mu_g \right] \left( \frac{f_g u_t}{\phi S_g} \right)^{1/3}$$

where $f_g$ is the quality of the foam, $\mu_w$ is the viscosity of an aqueous phase, $\mu_g$ is the velocity of the gas phase in continuous form, $u_t$ is the total velocity of the gas and of the solution, $C_f$ is a constant for the rock-fluids system considered, $k_{rwmax}$ is a maximum value of relative water permeability, $k_{rgmax}$ is a maximum value of the relative gas permeability, $S_g$ is a gas saturation, $\square$ is a porosity, $\alpha_w$ is an exponent of the power function representative of the relative water permeability measurements, $\alpha_g$ is an exponent of a power function representative of a relative gas permeability measurements, and $\overline{S_w}$ is a normed water saturation.

13. A method as claimed in claim 12, wherein the foam displacement model further is a function of at least one interpolation function $F_k$ depending on a parameter $V_k$ different from water saturation and wherein, prior to step B and for each of the interpolation functions $F_k$, steps i) to iii) are repeated for different values of the parameter $V_k$ of the interpolation function $F_k$, and constants relative to the interpolation function $F_k$ are determined from the optimal mobility reduction factor and from a mobility reduction factor relative to the interpolation function $F_k$.

14. A method as claimed in claim 13, wherein the parameter $V_k$ is selected from a foaming agent concentration, an oil saturation and a gas flow rate.

15. A method as claimed in claim 14, wherein a mobility reduction factor $M_{mod}^k$ relative to function $F_k$ is expressed by a formula:

$$F_k(V_k) = \frac{M_{mod}^k - 1}{M_{mod}^{opt} - 1}$$

where $M_{mod}^{opt}$ is the optimal mobility reduction factor.

16. A method as claimed in claim 13, wherein a mobility reduction factor $M_{mod}^k$ relative to function $F_k$ is expressed by a formula:

$$F_k(V_k) = \frac{M_{mod}^k - 1}{M_{mod}^{opt} - 1}$$

where $M_{mod}^{opt}$ is the optimal mobility reduction factor.

17. A method as claimed in claim 1, wherein the foam displacement model further is a function of at least one interpolation function $F_k$ depending on a parameter $V_k$ different from water saturation and wherein, prior to step B and for each of the interpolation functions $F_k$, steps i) to iii) are repeated for different values of the parameter $V_k$ of the interpolation function $F_k$, and constants relative to the interpolation function $F_k$ are determined from the optimal mobility reduction factor and from a mobility reduction factor relative to the interpolation function $F_k$.

18. A method as claimed in claim 17, wherein the parameter $V_k$ is selected from a foaming agent concentration, an oil saturation and a gas flow rate.

19. A method as claimed in claim 18, wherein a mobility reduction factor $M_{mod}^k$ relative to function $F_k$ is expressed by a formula:

$$F_k(V_k) = \frac{M_{mod}^k - 1}{M_{mod}^{opt} - 1}$$

where $M_{mod}^{opt}$ is the optimal mobility reduction factor.

20. A method as claimed in claim 17, wherein the parameter $V_k$ is selected from a foaming agent concentration, an oil saturation and a gas flow rate.

21. A method as claimed in claim 20, wherein a mobility reduction factor $M_{mod}^k$ relative to function $F_k$ is expressed by a formula:

$$F_k(V_k) = \frac{M_{mod}^k - 1}{M_{mod}^{opt} - 1}$$

where $M_{mod}^{opt}$ is the optimal mobility reduction factor.

22. A method as claimed in claim 17, wherein a mobility reduction factor $M_{mod}^k$ relative to function $F_k$ is expressed by a formula:

$$F_k(V_k) = \frac{M_{mod}^k - 1}{M_{mod}^{opt} - 1}$$

where $M_{mod}^{opt}$ is the optimal mobility reduction factor.

* * * * *